A. S. HUBBARD.
STORAGE BATTERY.
APPLICATION FILED JULY 26, 1918.
1,363,649.
Patented Dec. 28, 1920.
2 SHEETS—SHEET 1.
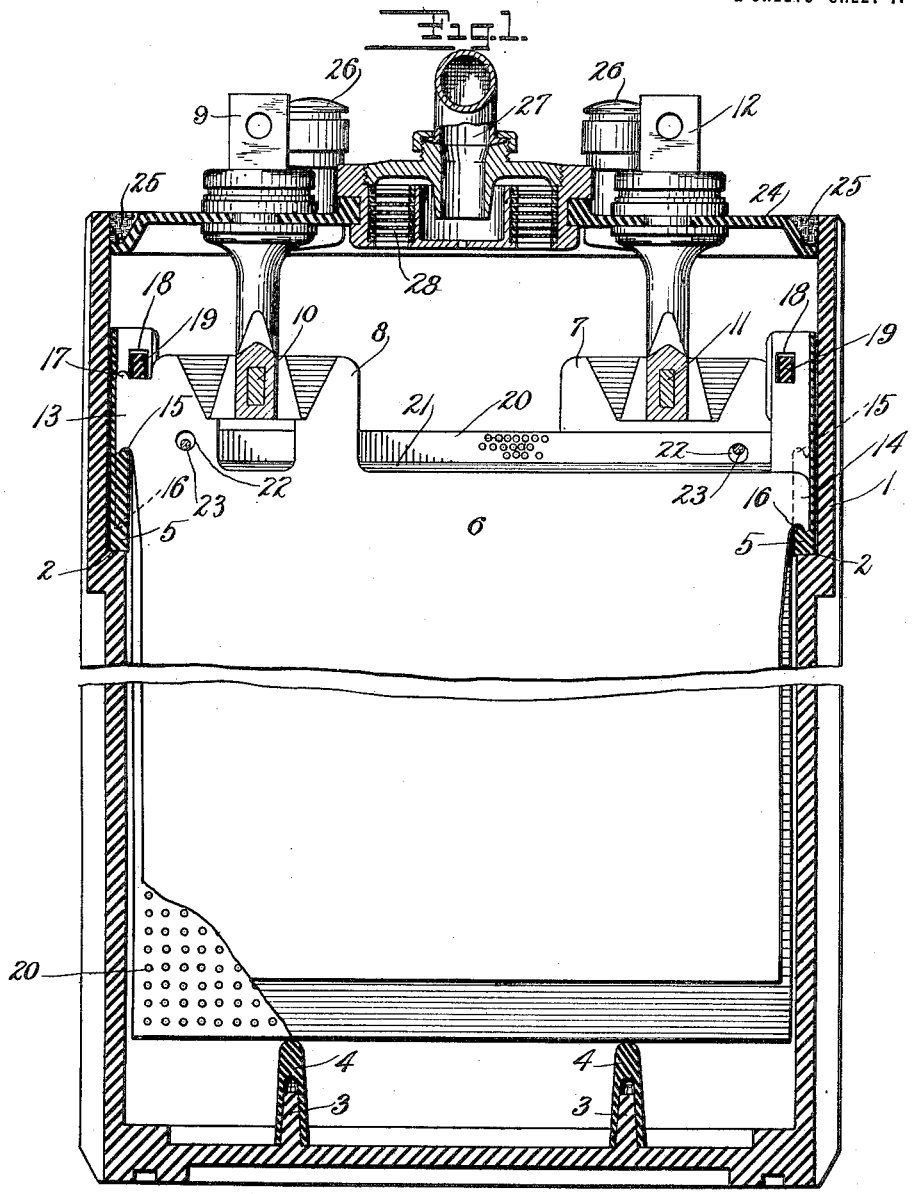
Inventor
Albert S. Hubbard
By his Attorneys
Kenyon & Kenyon

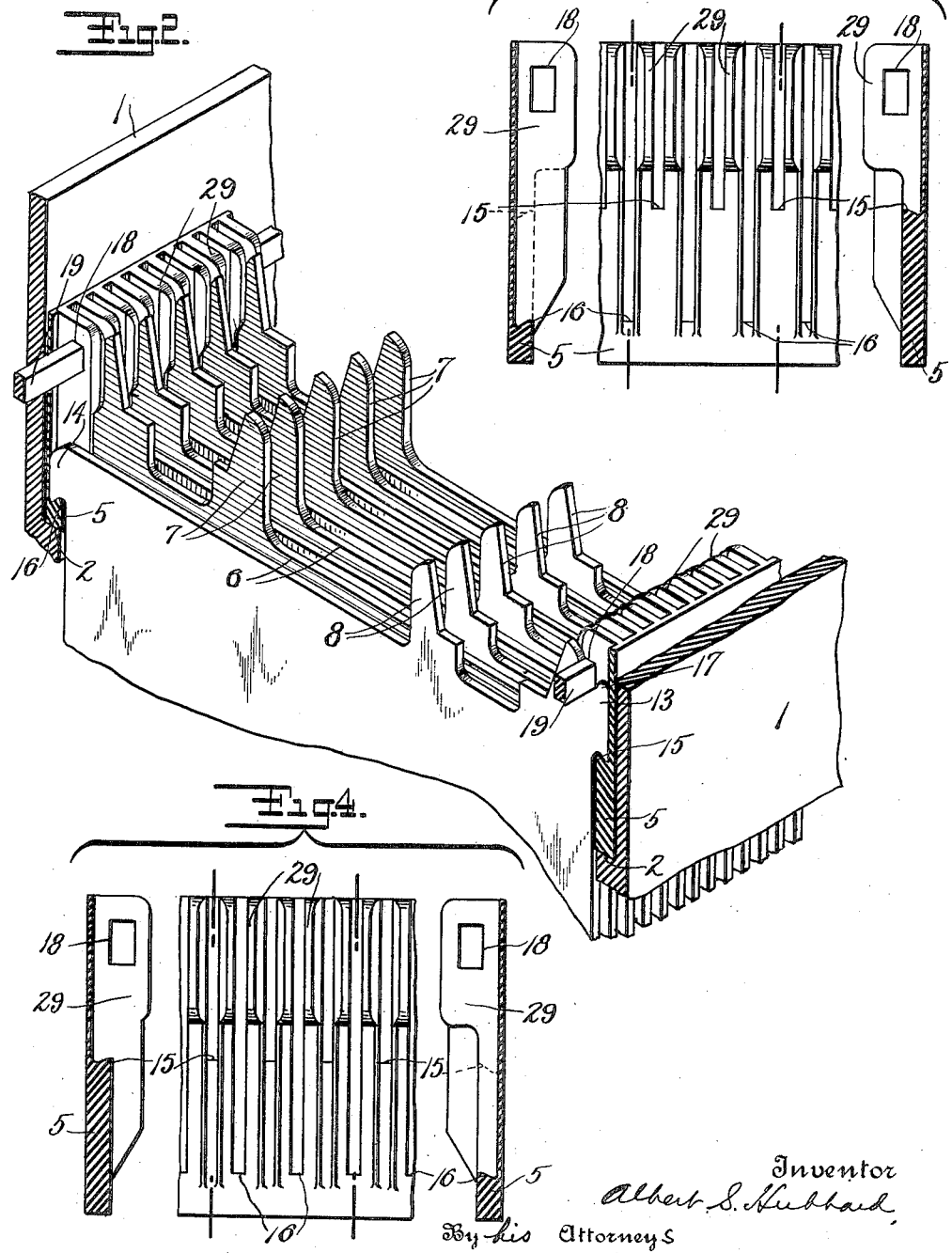

UNITED STATES PATENT OFFICE.

ALBERT S. HUBBARD, OF NEW YORK, N. Y., ASSIGNOR TO GOULD STORAGE BATTERY COMPANY, A CORPORATION OF NEW YORK.

STORAGE BATTERY.

1,363,649.  Specification of Letters Patent.  Patented Dec. 28, 1920.

Application filed July 26, 1918. Serial No. 246,816.

*To all whom it may concern:*

Be it known that I, ALBERT S. HUBBARD, a citizen of the United States, residing in the city of New York, county of New York, and State of New York, and whose post-office address is 161 East 36th street, New York city, have invented certain new and useful Improvements in Storage Batteries, of which the following is a specification.

My invention relates to storage batteries and particularly to a support for the ends of the plates and method of supporting the plates.

It is an object of my invention to provide a construction in which the plates may be suitably supported in such a way as to avoid the occurrence of short circuit by deposit of sediment and by means of which the plates may be readily removed from the container and at the same time be supported at both ends so as to avoid any stress or strain upon the lugs which are connected with the bus bars.

A storage battery incorporating my invention is shown in the accompanying drawings forming a part of this specification and representing the invention in one of its embodiments, and in which—

Figure 1 is a section of a battery showing the relation of the parts thereof.

Fig. 2 is an enlarged perspective showing a number of plates with the container broken away at various points.

Fig. 3 shows a front view of the supporting member and also two sectional views.

Fig. 4 shows a view similar to Fig. 3.

Referring to Fig. 1, the battery comprises a container 1 of any suitable material and construction provided with an inwardly projecting shoulder 2 on opposite sides thereof. In the bottom of the container are two supports 3 on which are placed members 4 upon which the wood separators rest. Inside the container and on the shoulders 2 are placed supporting members 5. Resting on the supports 5 are plates 6. These plates 6 may be designated as the positive plates and plates 7, shown in Fig. 2, may be designated as the negative plates. These plates are arranged alternately in a well known way. Each of the plates has on one end a connector lug 8 which is suitably connected with the terminal 9. This connection usually consists in lead-burning the various plates of one polarity to a bus bar 10 which is in turn connected with the terminal 9. The negative plates are likewise burned to a bus bar 11 which in turn is connected with the terminal 12. Each plate has also a projection 13 on one end and a projection 14 on the other end. The projection 13 engages the support 5 and is supported thereby at a point 15. The projection 14 in a similar manner engages the support 5 on the other side of the container and is supported thereby at a point 16. The point 15 is considerably higher than the point 16.

Referring to Figs. 3 and 4, the high supporting points will be designated as 15 in each instance and the low supporting points as 16. The arrangement is such that the opposite ends of the same plate are supported at points of different levels, and also the adjacent ends of alternate plates are supported at different levels; or in other words the end of the plate having a connector lug on that end rests on supports at the same level as do the ends of the plates of opposite polarity on which there is a connector lug; in each case the ends opposite the connector lugs rest on supports at the same level, and since with alternate plates the ends with connector lugs are at opposite sides of the container, this will result in the adjacent ends of alternate plates resting on supports at different levels. By this arrangement the distance between the adjacent ends of alternate plates is so much increased that short circuiting by the deposit of sediment on top of the plates is not likely to happen.

The lug 13 has also a slight upward projection 17 thereon. The supporting member has an opening 18 therethrough. Placed in the opening 18 is a member 19 of insulating material which passes over the flat part of the lug 13 as clearly shown in Fig. 1.

Between each of the two plates of opposite polarity is placed a suitable separator. This separator comprises a hard rubber sheet 20 and a wooden sheet 21 of the general construction shown in patent to W. S. Gould No. 1,195,924, patented August 22, 1916. The separator is supported in place by allowing the wood part to rest on the supports 4, and the rubber part is provided with holes 22 coinciding with corresponding holes in the lugs 13, through which pass the rods 23 for supporting the same.

The container 1 is provided with a suitable top 24 which is fastened in place in the ordinary way by cement 25. Passing through the top 24 and fastened therein in any suitable way are inlet ducts 26 for the purpose of allowing air to enter the container. Also suitably attached to the cover 24 and passing therethrough is an outlet duct 27. The duct 27 communicates with the interior of the cell through baffle plates 28 in a well known way. The outlet 27 may be connected with any kind of suction apparatus for exhausting the gases from the battery and drawing cooling air in through the vents or ducts 26. This arrangement is particularly important in connection with submarine batteries where it is necessary to ventilate the same or exhaust the gases issuing from the battery during charge and discharge.

The terminals 9 and 12 are likewise connected with the top 24 in any suitable manner.

It will be noted that the supports 5 are separate from the container and rest on the horizontal shoulders 2. This construction permits the plates to expand and contract without producing any strain upon the container. This expansion and contraction takes place to a limited extent whenever the temperature of the plates is changed materially.

By reference to Figs. 3 and 4 it will be noted that the supports 5 are provided with integral projections 29. These projections are so proportioned that they extend outwardly from the supports a distance sufficient to cover a small portion of the end of the separators. This construction prevents the sediment from accumulating from plate to plate around the side edges of the separators and between the separators and the supports 5.

From the foregoing description it will be evident that by means of the arrangement the ends of the plates are not only positively supported, but by reason of the supports being at different levels the possibility of short circuit from sediment is greatly reduced. Also the plates may be lifted out of the container by attaching the lifting means to the terminals or lugs and part of the force which is applied to lift the plates out of the container will be applied through the support to the end of the plates opposite the ends on which the lugs are placed so that both ends of the plate will be positively raised and thereby any tendency obviated to cause the plates to break at or near the terminals.

While I have shown the supporting members with a plurality of supporting points on each one, I do not desire to be limited to such a construction because the supporting members may be separated so that they will be of any desired length, thereby supporting one only or more plates. It is not essential to my invention that the plates having the connector lugs should be supported on supports at the same level as obviously they may be supported at varying levels. One of the important features is that the adjacent ends of alternate plates shall be supported at different levels.

Having described my invention, what I claim as new and desire to secure by Letters Patent is:

1. A support for storage battery plates comprising a strip of insulating material with supporting surfaces thereon and a relatively thin partition extending out beyond adjacent supporting surfaces.

2. A support for the ends of storage battery plates comprising a strip of insulating material having a plurality of supporting points at one level and a plurality of supporting points at a different level.

3. A support for the ends of storage battery plates comprising a strip of insulating material having a plurality of supporting points at one level and a plurality of supporting points at a different level and a partition between the adjacent points of support.

4. In a storage battery the combination of a container, a plurality of positive plates and a plurality of negative plates, a support for each end of each of said plates, the supports for the ends of each plate being at a different level.

5. In a storage battery the combination of a container, a plurality of positive plates and a plurality of negative plates, a support for each end of each of said plates, the supports for the adjacent ends of alternate plates being at different levels.

6. In a storage battery, the combination of a container, a plurality of positive plates and a plurality of negative plates, a support for each end of each of said plates, the supports for the ends of each plate being at a different level and a partition separating said supports.

7. In a storage battery, the combination of a container, a plurality of positive plates and a plurality of negative plates therein, separators between said plates, a support for each end of each of said plates, adjacent supports of alternate plates being at different levels, connector lugs on each of said plates and means in each support for connecting the plate therein having a connector lug on that end with said support.

8. In a storage battery, the combination of a container, a plurality of positive plates and a plurality of negative plates therein, separators between said plates, a support for each end of each of said plates, adjacent supports of alternate plates being at different levels, connector lugs on each of said plates and means in each support for connecting the plate therein having a connector lug on that end with said support, and a partition on said supports on each side of each end of said positive plates covering a substantial part of the edge of the separators adjacent the ends of the plates.

9. In a storage battery the combination of a container having an inwardly projecting shoulder on two opposite sides thereof, a plurality of positive plates, a plurality of negative plates, connecting lugs on one end of each of said plates, means connecting the lugs of each set of plates together, a support for one end of each plate positioned on each of said shoulders, said supports having alternate supporting points at different levels, the plates having the lugs thereon resting on the upper supports, and means for fastening said plates to the supports whereby the lifting force applied to the plates at the ends having the lugs will be transmitted through the supports to the alternate plates at their ends distant from the lugs.

10. In a storage battery the combination of a container having an inwardly projecting shoulder on two opposite sides thereof, a plurality of positive plates, a plurality of negative plates, connecting lugs on one end of each of said plates, means connecting the lugs of each set of plates together, a support for one end of each plate positioned on each of said shoulders, said supports having alternate supporting points and means for fastening said plates to the supports whereby the lifting force applied to the plates at the ends having the lugs will be transmitted through the supports to the alternate plates at their ends distant from the lugs.

11. In a storage battery the combination of a container having an inwardly projecting shoulder on two opposite sides thereof, a plurality of positive plates, a plurality of negative plates, connecting lugs on one end of each of said plates, means connecting the lugs of each set of plates together, a support for one end of each plate positioned on each of said shoulders, said supports having alternate supporting points at different levels, the plate having the lugs thereon resting on the upper supports and a partition integral with said supports extending outwardly for a substantial distance between adjacent plates.

12. A unitary support for one end of storage battery plates of opposite polarity comprising a body member with a supporting point for each plate, said points for plates of opposite polarity being at different levels.

13. A unitary support for one end of storage battery plates of opposite polarity comprising a body member with a supporting point for each plate, said points for plates of opposite polarity being at different levels and integral projections extending outwardly from said support between plates of opposite polarity.

14. The method of supporting storage battery plates consisting in positively supporting both ends of each plate on supports at different levels.

15. The method of supporting storage battery plates consisting in positively supporting both ends of each plate on supports for adjacent ends of alternate plates at different levels.

16. The method of supporting storage battery plates consisting in positively supporting both ends of each plate on supports for adjacent ends of alternate plates at different levels and separating the adjacent ends of alternate plates by a partition impervious to sediment.

In testimony whereof I have signed my name to this specification.

ALBERT S. HUBBARD.